US012438305B2

(12) United States Patent
Norris et al.

(10) Patent No.: US 12,438,305 B2
(45) Date of Patent: Oct. 7, 2025

(54) ELECTRICAL CONNECTOR INCLUDING TUBULAR WIRE CONNECTION PORTION AND PIN CONNECTION PORTION

(71) Applicant: Cummins Emission Solutions Inc., Columbus, IN (US)

(72) Inventors: Colin L. Norris, Columbus, IN (US); Ryan M. Johnson, Cottage Grove, WI (US); Daniel Edward Novreske, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 347 days.

(21) Appl. No.: 17/886,844

(22) Filed: Aug. 12, 2022

(65) Prior Publication Data

US 2024/0055802 A1 Feb. 15, 2024

(51) Int. Cl.

| | |
|---|---|
| ***H01R 13/639*** | (2006.01) |
| ***H01R 4/20*** | (2006.01) |
| ***H01R 13/05*** | (2006.01) |
| ***H01R 13/621*** | (2006.01) |

(52) U.S. Cl.

CPC ............. *H01R 13/639* (2013.01); *H01R 4/20* (2013.01); *H01R 13/052* (2013.01); *H01R 13/621* (2013.01); *H01R 2201/26* (2013.01)

(58) Field of Classification Search

CPC ...... H01R 11/12; H01R 4/12; H01R 2201/26; H01R 4/38; H01R 4/36

See application file for complete search history.

(56) References Cited

U.S. PATENT DOCUMENTS

| | | | | |
|---|---|---|---|---|
| 3,739,322 | A * | 6/1973 | Haegert | H01R 11/281 439/764 |
| 4,365,909 | A * | 12/1982 | Stephan | F16D 1/0864 403/287 |
| D325,899 | S | 5/1992 | Krokaugger | |
| 6,726,510 | B2 | 4/2004 | Norbert et al. | |
| 8,987,595 | B2 | 3/2015 | Bumgarner | |
| 2003/0092325 | A1 | 5/2003 | Schad et al. | |
| 2022/0302614 | A1 | 9/2022 | Peltier et al. | |

OTHER PUBLICATIONS

Notice of Allowance in Design U.S. Appl. No. 29/849,663 issued Jan. 26, 2024.

* cited by examiner

*Primary Examiner* — Briggitte R. Hammond
(74) *Attorney, Agent, or Firm* — Foley & Lardner LLP

(57) ABSTRACT

An electrical connector includes a tubular wire connection portion having recess in which a wire is insertable. The recess extends in a first direction. The tubular wire connection portion crimps onto the wire. The electrical connector further includes a pin connection portion having first and second projections extending from the tubular wire connection portion, a first through hole that extends through the first projection, a second through hole that extends through the second projection, and a third through hole that is defined by the first projection and the second projection and extends in a direction transverse to the first and second through holes. The first and second through holes receive a fastener and move towards each other upon fastening of the fastener. The third through hole receives a pin and clamps the pin when the first and second through holes are moved towards each other by the fastener.

19 Claims, 12 Drawing Sheets

ELECTRICAL CONNECTOR INCLUDING TUBULAR WIRE CONNECTION PORTION AND PIN CONNECTION PORTION

BACKGROUND

The present application relates generally to the field of aftertreatment systems for use with internal combustion (IC) engines. More specifically, the present application relates to electrical connectors and methods of making an electrical connection.

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. Such aftertreatment systems may include a selective catalytic reduction (SCR) system, a heater configured to heat exhaust gas upstream of the SCR system, and an electrical connector that provides an electrical current to the heater. Providing an electrical current to the heater allows the heater to heat the exhaust gas to a temperature to facilitate treatment by the SCR system.

SUMMARY

Known electrical connectors generate heat at the electrical connector that reduces the efficiency of the system. Embodiments of the invention address this problems.

In some embodiments, an electrical connector includes a tubular wire connection portion having recess in which a wire is insertable. The recess extends in a first direction. The tubular wire connection portion crimps onto the wire. The electrical connector further includes a pin connection portion having first and second projections extending from the tubular wire connection portion, a first through hole that extends through the first projection, a second through hole that extends through the second projection and is aligned with the first through hole, and a third through hole that is defined by the first projection and the second projection and extends in a direction transverse to the first and second through holes. The first and second through holes receive a fastener and move towards each other upon fastening of the fastener. The third through hole receives a pin and clamps the pin when the first and second through holes are moved towards each other by the fastener.

In some embodiments, an aftertreatment system includes a heater having a pin, a heater power source having a wire, and an electrical connector. The electrical connector includes a tubular wire connection portion having recess in which the wire is insertable. The recess extends in a first direction. The tubular wire connection portion crimps onto the wire. The electrical connector further includes a pin connection portion having first and second projections extending from the tubular wire connection portion, a first through hole that extends through the first projection, a second through hole that extends through the second projection and is aligned with the first through hole, and a third through hole that is defined by the first projection and the second projection and extends in a direction transverse to the first and second through holes. The first and second through holes receive a fastener and to move towards each other upon fastening of the fastener. The third through hole receives the pin and clamps the pin when the first and second through holes are moved towards each other by the fastener.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1A:
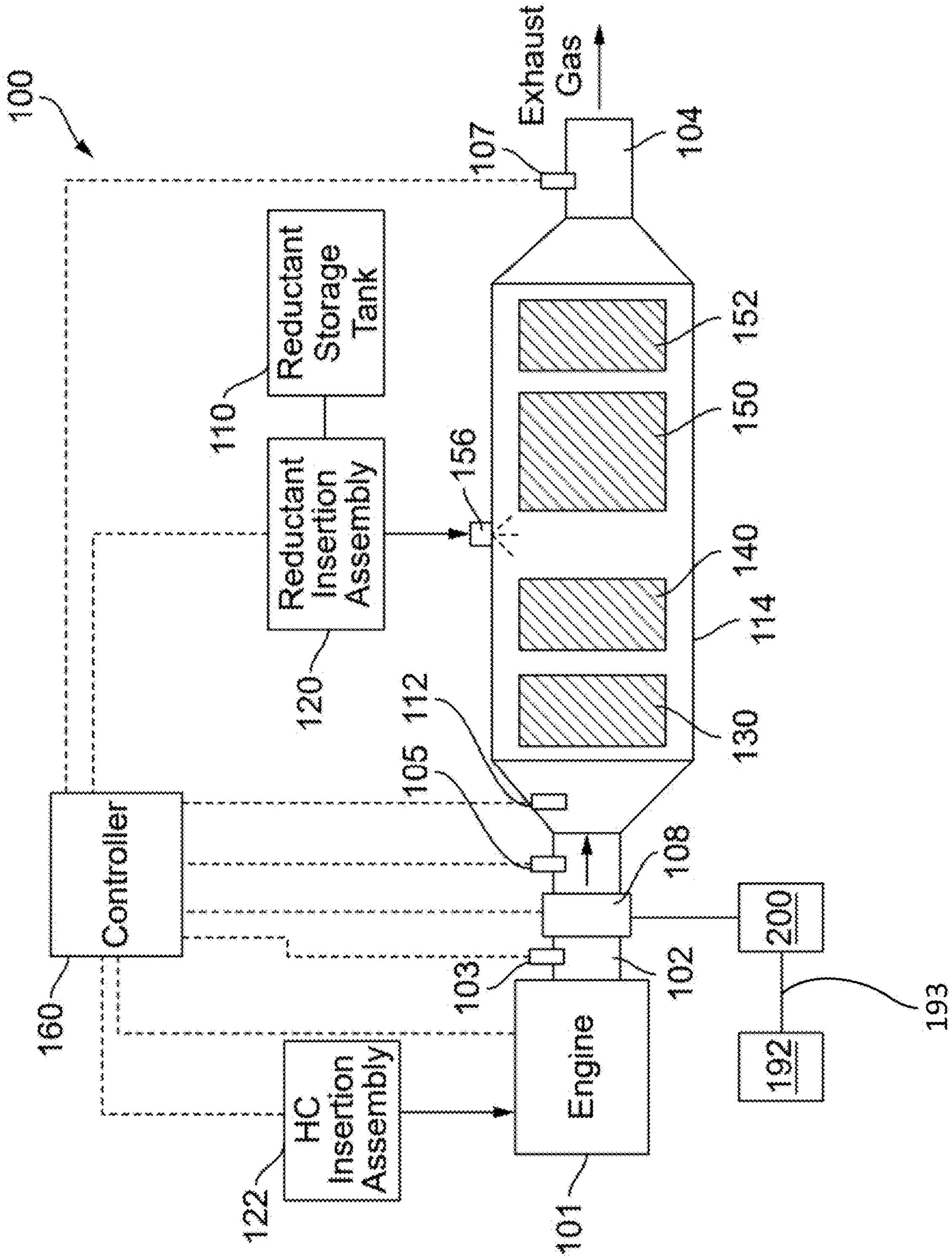
FIG. 1A is a diagram of an aftertreatment system including an electrical connector, according to an embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

I. OVERVIEW

To improve the heating of exhaust gases in aftertreatment systems that use electrical connectors, it may be desirable to use the electrical connector to provide a high electrical current to a heater. However, it can be difficult to conduct a high electrical current without increasing a temperature of the electrical connector through a resistance connection. This increase of temperature can lead to local damage and potential reduction of the ability to deliver thermal energy to the exhaust, which in turn could impact aftertreatment systems and system emissions.

Various embodiments of the electrical connector described herein may provide one or more advantages, including, for example: (1) improved electrical conductivity and reduced heat generation at the electrical connector through a low resistance connection due to the low resistivity of copper, as compared to using a stainless steel stub with a stainless steel electrical connector; (2) reduced mass, volume, and cost as compared to using a junction box with ring eyelets bolted to buss bars; (3) reduced risk of breaking the pin, increased ease of installation, and facilitation of tightening and undoing for service, through use of crimping and clamping that allows for installing the electrical connector without having to twist the wire or the pin; and (4) lower cost and improved manufacturability and servicing conditions as compared to using a permanent connection between the electrical connector and the pin.

II. OVERVIEW OF EXHAUST GAS AFTERTREATMENT SYSTEMS

Figure 1B:
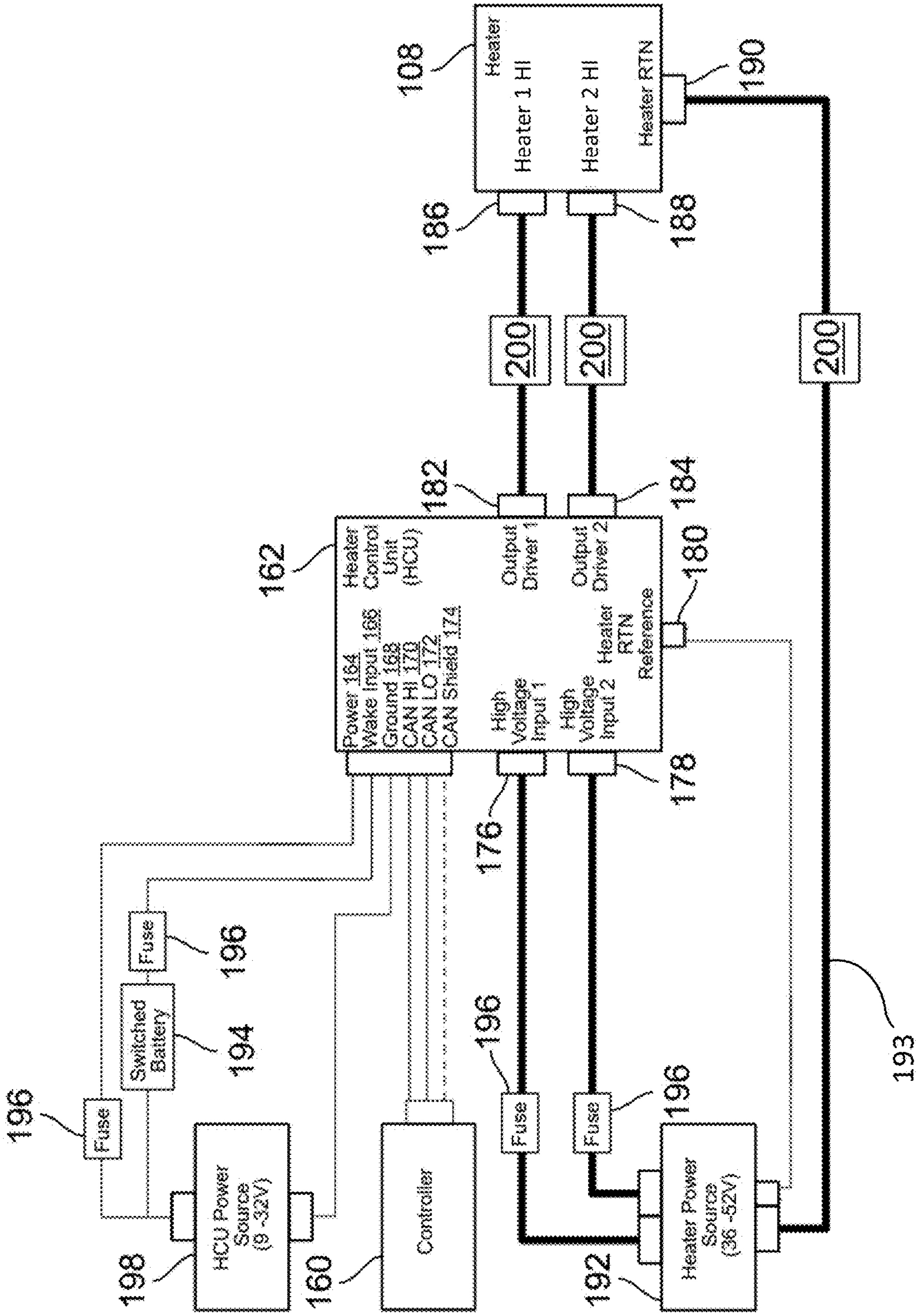
FIG. 1B is a diagram of an electrical system for a heater control unit for the aftertreatment system of FIG. 1A, according to an embodiment.

FIGS. 1A and 1B illustrate an aftertreatment system 100, according to an embodiment. The aftertreatment system 100 includes a heater 108. The heater 108 includes a pin 109 (e.g., conductor pin, cold pin, heater conductor, etc.), a heater power source 192, and an electrical connector 200 (discussed in further detail herein). In some embodiments, the pin 109 may be made of nickel-clad copper or other suitable materials. The heater power source 192 includes a wire 193 (e.g., cable, coil, line, etc.). In some embodiments, the wire 193 includes an insulated copper portion. The wire 193 may be made of copper or other suitable materials, such as aluminum. In some embodiments, the wire 193 may be a multi-strand wire. In other embodiments, the wire 193 may be a single-strand wire. In some embodiments, the wire 193 may have a cross-sectional area that is between approximately 10 $mm^2$ and approximately 70 $mm^2$. In other embodiments, the wire 193 may have a cross-sectional area that is between approximately 25 $mm^2$ and approximately 50 $mm^2$.

The aftertreatment system 100 is configured to receive an exhaust gas (e.g., diesel exhaust gas, etc.) from an engine 101 (e.g., motor, etc.) and treat constituents (e.g., $NO_X$, CO, $CO_2$, etc.) of the exhaust gas. The aftertreatment system 100 may also include an inlet conduit 102, a first temperature sensor 103, an outlet conduit 104, a second temperature sensor 105, an outlet sensor 107, a reductant storage tank 110, a gas sensor 112, a reductant insertion assembly 120, a hydrocarbon insertion assembly 122, an oxidation catalyst 130, a filter 140, a selective catalytic reduction (SCR) system 150, a reductant port 156, an ammonia oxidation ($AMO_X$) catalyst 152, a controller 160, a heater control unit (HCU) 162, a switched battery 194, and/or a fuse 196.

The engine 101 may include, for example, a diesel engine, a gasoline engine, a natural gas engine, a dual fuel engine, a biodiesel engine, an E-85 engine, or any other suitable engine. The engine 101 combusts fuel and generates an exhaust gas that includes $NO_X$, CO, $CO_2$, and other constituents. The engine 101 may include other components, for example, a transmission, fuel insertion assemblies, a generator or alternator to convert the mechanical power produced by the engine into electrical power (e.g., to power the heater 108, the gas sensor 112, the reductant insertion assembly 120, the hydrocarbon insertion assembly 122, and the controller 160, etc.).

The aftertreatment system 100 may include a housing 114 (e.g., casing, cover, container, shell, etc.) in which various aftertreatment components of the aftertreatment system 100 are disposed. The housing 114 may be formed from a rigid, heat-resistant and corrosion-resistant material, for example stainless steel, iron, aluminum, metals, ceramics, or any other suitable material. The housing 114 may have any suitable cross-section, for example, circular, square, rectangular, oval, elliptical, polygonal, or any other suitable shape.

The aftertreatment system 100 may include an inlet conduit 102 (e.g., channel, duct, pipe, tube, chute, etc.) that is fluidly coupled to an inlet of the housing 114 and structured to receive exhaust gas from the engine 101 and communicate the exhaust gas to an internal volume defined by the housing 114. Furthermore, an outlet conduit 104 (e.g., channel, duct, pipe, tube, chute, etc.) may be coupled to an outlet of the housing 114 and structured to expel treated exhaust gas into the environment (e.g., treated to remove particulate matter such as soot by the filter 140 and/or reduce constituents of the exhaust gas such as $NO_X$ gases, CO, unburnt hydrocarbons, etc. included in the exhaust gas by the SCR system 150 and the oxidation catalyst 130).

The aftertreatment system 100 includes a heater 108 (e.g., ceramic heater, electric heater, etc.). In some embodiments, the heater 108 is disposed upstream of other aftertreatment components, for example, near the inlet conduit 102 proximate to an engine exhaust manifold (e.g., at an outlet of a turbo coupled to the engine 101). The heater 108 may be coupled to an aftertreatment inlet assembly, where the aftertreatment inlet assembly is fluidly coupled to the inlet conduit 102. In other embodiments, the heater 108 is disposed downstream of some of the other aftertreatment components, for example, downstream of the filter 140 and upstream of the SCR system 150. The heater 108 may be an electrical heater, which may have an input voltage in a range of 36 V to 52 V and a heater power in a range of 10 to 100 kW (i.e., the electrical power consumed by the heater 108 to generate heat). As used herein, a range of X to Y includes X, Y, and values between X and Y. In some embodiments, the heater 108 is a 48 V, 10 kW electric heater. In other embodiments, the heater 108 includes two or more 48 V, 10 kW electric heaters. The heater 108 is configured to selectively heat the exhaust gas entering the aftertreatment system 100, such that heating of the exhaust gas by the heater 108 causes an increase in a temperature of a heating element of the gas sensor 112 as the heated exhaust gas flows over the gas sensor 112. For example, the heater 108 can be selectively activated to heat the exhaust gas flowing therethrough towards the gas sensor 112 and the aftertreatment components, and thereby heat the gas sensor 112, as well as downstream aftertreatment components (e.g., heat the oxidation catalyst 130 to a light-off temperature, heat the SCR system 150 to its operating temperature, etc.).

Figure 2:
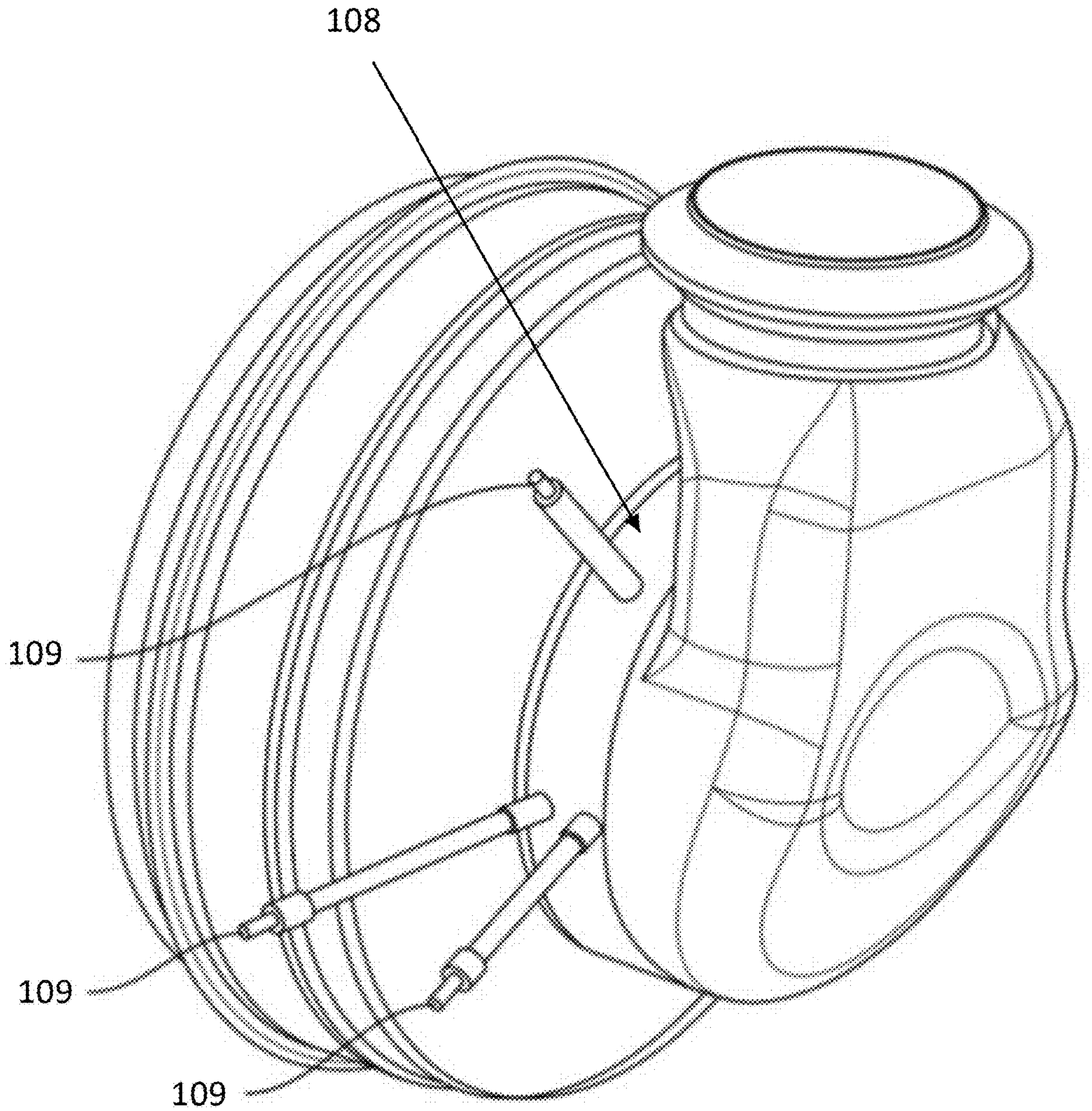
FIG. 2 is a perspective view of a heater of the aftertreatment system of FIGS. 1A and 1B including a pin, according to an embodiment.

The heater 108 has a pin 109 (discussed in further detail herein) for connecting to an electrical connector 200 (discussed in further detail herein). In FIG. 2, the heater 108 has three pins 109. In other embodiments, the heater 108 may have one, two, three, four, or more pins 109.

The aftertreatment system 100 includes a heater power source 192. The heater power source 192 has a wire 193 for connecting to the electrical connector 200. The heater power source 192 may have a voltage that is approximately in a range of 36-52 V.

The aftertreatment system 100 includes an electrical connector 200. The electrical connector 200 is connected to the wire 193 of the heater power source 192. The electrical connector 200 is also connected to the pin 109 of the heater 108.

The aftertreatment system 100 may include a first temperature sensor 103 (e.g., detector, indicator, etc.). The first temperature sensor 103 may be positioned in the inlet conduit 102 upstream of the heater 108. The first temperature sensor 103 is configured to measure an upstream exhaust gas temperature of the exhaust gas upstream of the heater 108. In some embodiments, a second temperature sensor 105 is also disposed downstream of the heater 108, for example, proximate to an outlet of the heater 108 and configured to measure a downstream exhaust gas temperature of the exhaust gas downstream of the heater 108. In some embodiments, other sensors, for example, pressure sensors, oxygen sensors, and/or any other sensors configured to measure one or more operational parameters of the exhaust gas entering the aftertreatment system 100 may be disposed in the inlet conduit 102. In some embodiments, each of the first temperature sensor 103 and the second temperature sensor 105 may be excluded, and instead, the upstream and downstream exhaust gas temperatures may be determined virtually (e.g., by the controller 160), using equations, algorithms, or look up tables, for example, based on operating parameters of the engine 101 exhaust gas flow rate, heater power consumed, etc.

The aftertreatment system 100 may include an oxidation catalyst 130. The oxidation catalyst 130 is disposed downstream of the heater 108 in the housing 114 and configured to decompose unburnt hydrocarbons and/or CO included in the exhaust gas. In some embodiments, the oxidation catalyst 130 may include a diesel oxidation catalyst. The hydrocarbon insertion assembly 122 is configured to selectively insert hydrocarbons (e.g., the same fuel that is being consumed by the engine 101) upstream of the oxidation catalyst 130, for example, into the engine 101. When a temperature of the oxidation catalyst 130 is equal to or above a light-off temperature of the oxidation catalyst 130, the oxidation catalyst 130 catalyzes combustion of the inserted hydrocarbons so as to cause an increase in the temperature of the exhaust gas. In some embodiments, the hydrocarbon insertion assembly 122 may be selectively activated (e.g., by the controller 160) to insert hydrocarbons into the oxidation catalyst 130 for heating the exhaust gas and thereby, the filter 140 and SCR system 150. In some embodiments, insertion of the hydrocarbons may heat the exhaust gas to a sufficient temperature to regenerate the filter 140 by burning off particulate matter that may have accumulated on the filter 140, and/or regenerate the SCR system 150 by evaporating reductant deposits deposited on the SCR system 150 or internal surfaces of the aftertreatment system 100.

The aftertreatment system 100 may include a gas sensor 112 (e.g., a $NO_X$ sensor, detector, indicator, etc.) that is disposed in the housing 114 downstream of the heater 108 and upstream of any aftertreatment component that treats the constituents of the exhaust gas. For example, as shown in FIG. 1, the gas sensor 112 is disposed downstream of the heater 108 and upstream of the oxidation catalyst 130.

The aftertreatment system 100 may include an outlet sensor 107 (e.g., detector, indicator, etc.). The outlet sensor 107 may be positioned in the outlet conduit 104. The outlet sensor 107 may comprise a second $NO_X$ sensor configured to determine an amount of $NO_X$ gases expelled into the environment after passing through the SCR system 150. In other embodiments, the outlet sensor 107 may comprise a particulate matter sensor configured to determine an amount of particulate matter (e.g., soot included in the exhaust gas exiting the filter 140) in the exhaust gas being expelled into the environment. In still other embodiments, the outlet sensor 107 may comprise an ammonia sensor configured to measure an amount of ammonia in the exhaust gas flowing out of the SCR system 150, i.e., determine the ammonia slip. The $AMO_X$ catalyst 152 may be positioned downstream of the SCR system 150 and formulated to decompose any unreacted ammonia that flows past the SCR system 150.

The aftertreatment system 100 may include a filter 140 (e.g., mesh, separator, etc.) that is disposed downstream of the oxidation catalyst 130 and upstream of the SCR system 150 and configured to remove particulate matter (e.g., soot, debris, inorganic particles, etc.) from the exhaust gas. In some embodiments, the filter 140 may include a ceramic filter. In some embodiments, the filter 140 may include a cordierite filter which can, for example, be an asymmetric filter. In yet other embodiments, the filter 140 may be catalyzed.

The aftertreatment system 100 may include a SCR system 150 that is configured to decompose constituents of an exhaust gas flowing therethrough in the presence of a reductant, as described herein. In some embodiments, the SCR system 150 may include a selective catalytic reduction filter (SCRF). The SCR system 150 includes a SCR catalyst configured to catalyze decomposition of the $NO_X$ gases into its constituents in the presence of a reductant. Any suitable SCR catalyst may be used such as, for example, platinum, palladium, rhodium, cerium, iron, manganese, copper, vanadium based catalyst, any other suitable catalyst, or a combination thereof. The SCR catalyst may be disposed on a suitable substrate such as, for example, a ceramic (e.g., cordierite) or metallic (e.g., kanthal) monolith core that can, for example, define a honeycomb structure. A washcoat can also be used as a carrier material for the SCR catalyst. Such washcoat materials may comprise, for example, aluminum oxide, titanium dioxide, silicon dioxide, any other suitable washcoat material, or a combination thereof.

Although FIG. 1 illustrates only the oxidation catalyst 130, the filter 140, the SCR system 150, and the $AMO_X$ catalyst 152 disposed in the internal volume defined by the housing 114, in other embodiments, a plurality of aftertreatment components may be disposed in the internal volume defined by the housing 114 in addition to, or in place of the oxidation catalyst 130, the filter 140, the SCR system 150, and the $AMO_X$ catalyst 152. Such aftertreatment components may include, for example, a two-way catalyst, mixers, baffle plates, secondary filters (e.g., a secondary partial flow or catalyzed filter) and/or any other suitable aftertreatment component.

The aftertreatment system 100 may include a reductant port 156 (e.g., opening, outlet, etc.). The reductant port 156 may be positioned on a sidewall of the housing 114 and structured to allow insertion of a reductant therethrough into the internal volume defined by the housing 114. The reductant port 156 may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). Mixers, baffles, vanes or other structures may be positioned in the housing 114 upstream of the SCR system 150 (e.g., between the filter 140 and the SCR system 150) so as to facilitate mixing of the reductant with the exhaust gas.

The aftertreatment system 100 may include a reductant storage tank 110 (e.g., container, reservoir, etc.) that is structured to store a reductant. The reductant is formulated to facilitate decomposition of the constituents of the exhaust gas (e.g., $NO_X$ gases included in the exhaust gas). Any suitable reductant may be used. In some embodiments, the exhaust gas comprises a diesel exhaust gas and the reductant comprises a diesel exhaust fluid (DEF). For example, the DEF may comprise urea, an aqueous solution of urea, or any other fluid that comprises ammonia, by-products, or any other diesel exhaust fluid as is known in the arts (e.g., the DEF marketed under the name ADBLUE®). For example, the reductant may comprise an aqueous urea solution having a particular ratio of urea to water. In some embodiments, the reductant can comprise an aqueous urea solution including 32.5% by weight of urea and 67.5% by weight of deionized water, including 40% by weight of urea and 60% by weight of deionized water, or any other suitable ratio of urea to deionized water.

The aftertreatment system 100 may include a reductant insertion assembly 120 that is fluidly coupled to the reductant storage tank 110. The reductant insertion assembly 120 is configured to selectively insert the reductant into the SCR system 150 or upstream thereof, or upstream or into a mixer (not shown) positioned upstream of the SCR system 150. The reductant insertion assembly 120 may comprise various structures to facilitate receipt of the reductant from the reductant storage tank 110 and delivery to the SCR system 150, for example, pumps, valves, screens, filters, etc.

The aftertreatment system 100 may include a reductant injector that is fluidly coupled to the reductant insertion assembly 120 and configured to insert the reductant (e.g., a combined flow of reductant and compressed air) into the SCR system 150. In some embodiments, the reductant injector may include a nozzle having a predetermined diameter. In some embodiments, the reductant injector may be positioned in the reductant port 156 and structured to deliver a stream or a jet of the reductant into the internal volume of the housing 114 so as to deliver the reductant to the SCR system 150.

The controller 160 may be operatively coupled to the first temperature sensor 103, the second temperature sensor 105, the gas sensor 112, the heater 108, and in some embodiments, the reductant insertion assembly 120, the hydrocarbon insertion assembly 122, and/or the outlet sensor 107. For example, the controller 160 may be configured to receive an upstream exhaust gas temperature signal from the first temperature sensor 103 and receive a downstream exhaust gas temperature signal from the second temperature sensor 105 to determine the upstream exhaust gas temperature and the downstream exhaust gas temperature, respectively. The controller 160 may also be configured to selectively activate the heater 108, and/or a heater module coupled to the heater 108 so as to heat the exhaust gas flowing through the heater 108 towards the SCR system 150, for heating the SCR system 150.

The controller 160 is configured to determine the upstream exhaust gas temperature upstream of the heater 108, for example, based on the exhaust gas temperature signal received from the first temperature sensor 103. The upstream exhaust gas temperature corresponds to the temperature of the exhaust gas entering the aftertreatment system 100. In response, to the upstream exhaust gas temperature being less than a first threshold, for example, the dew point temperature (e.g., 100 degrees Celsius), the controller 160 causes activation of the heater 108. The controller 160 may also be configured to determine the downstream exhaust gas temperature downstream of the heater 108, for example, based on a signal received from the second temperature sensor 105.

The controller 160 may be operably coupled to the engine 101, the first temperature sensor 103, the second temperature sensor 105, the heater 108, the gas sensor 112, the outlet sensor 107, the reductant insertion assembly 120, the hydrocarbon insertion assembly 122, and/or various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. In some embodiments, the controller 160 includes various circuitries or modules configured to perform the operations of the controller 160 described herein.

In some embodiments, the aftertreatment system 100 may include a heater control unit (HCU) 162 for controlling the heater 108, as in FIG. 1B. The HCU 162 has a power connection 164, a wake input connection 166, a ground connection 168, a CAN HI connection 170, a CAN LO connection 172, a CAN shield 174, a first high voltage input 176, a second high voltage input 178, a heater return (RTN) reference 180, a first output driver 182, and a second output driver 184.

The HCU 162 is connected to the controller 160 by the CAN HI connection 170 and the CAN LO connection 172. The CAN HI connection 170 and the CAN LO connection 172 are configured to allow the exchange of signals between the controller 160 and the HCU 162. When signals are exchanged between the controller 160 and the HCU 162, the voltage of the connection between the controller 160 and the CAN HI connection 170 is greater than the voltage of the connection between the controller 160 and the CAN LO connection 172. The CAN shield 174 is configured to cover (e.g., surround, etc.) connections of the HCU 162 (e.g., the power connection 164, the wake input connection 166, the ground connection 168, the CAN HI connection 170, the CAN LO connection 172, etc.), such that the CAN shield 174 prevents/minimizes electromagnetic interference between the connections of the HCU 162. In some embodiments, the CAN shield 174 is made of metal sheath (e.g., braided metal, etc.).

The aftertreatment system 100 may include a HCU power source 198 for providing power to the HCU 162. The HCU power source 198 has a voltage that is approximately in a range of 9-32 V. A first terminal of the HCU power source 198 is connected to the ground connection 168 of the HCU 162. A second terminal of the HCU power source 198 is connected and may provide a current to both the power connection 164 of the HCU 162 and to the wake input connection 166 of the HCU 162. When the HCU 162 is in a sleep mode, providing a current to the wake input connection 166 of the HCU 162 signals the HCU 162 to enter an active mode. When the HCU 162 is in an active mode, the HCU 162 receives power from the power connection 164 from the HCU power source 198. A fuse 196 is connected to the second terminal of the HCU power source 198 and the power connection 164 of the HCU 162. The fuse 196 may protect the HCU 162 in the event of the HCU power source 198 providing an excessive current to the HCU 162.

The aftertreatment system 100 may include a switched battery 194 positioned between the wake input connection 166 and the second terminal of the HCU power source 198. The switched battery 194 with the HCU power source 198 may provide a greater voltage to the wake input connection 166 of the HCU 162 than the voltage that the HCU power source 198 alone provides to the power connection 164 of the HCU 162. A fuse 196 is connected to the switched battery 194 and the power connection 164 of the HCU 162. The fuse 196 may protect the HCU 162 in the event of the HCU power source 198 and the switched battery 194 providing an excessive current to the HCU 162.

The HCU 162 is connected to the heater power source 192. A first end of the heater power source 192 is connected to and may provide a current to the first high voltage input 176 of the HCU 162. A fuse 196 is connected to the first end of the heater power source 192 and the power connection 164 of the HCU 162. A second end of the heater power source 192 is connected to and may provide a current to the second high voltage input 178 of the HCU 162. A fuse 196 is connected to the second end of the heater power source 192 and the second high voltage input 178 of the HCU 162. The fuses 196 may protect the HCU 162 in the event of the heater power source 192 providing an excessive current to the HCU 162. A third end of the heater power source 192 is connected to the heater RTN reference 180 of the HCU 162 and allows a current to be conducted from the HCU 162 to the heater power source 192.

The HCU 162 is connected to the heater 108. The heater 108 may have a first heater HI connection 186, a second heater HI connection 188, and a heater RTN connection 190 (e.g., a heater LO connection). The heater RTN connection 190 of the heater 108 is connected with an electrical connector 200 to a fourth end of the heater power source 192 and allows a current to be conducted from the heater 108 to the heater power source 192. In some embodiments, the first heater HI connection 186 is configured to receive a voltage of 48 V from the HCU 162, the second heater HI connection 188 is configured to receive a voltage of 48 V from the HCU 162, and the heater RTN connection 190 is configured to be a common return. In an embodiment where the heater 108 includes two electric heaters, the first heater HI connection 186 is coupled to a first electric heater, the second heater HI connection 188 is coupled to a second electric heater, and the heater RTN connection 190 is coupled to both the first electric heater and the second electric heater to provide a common return to both the first electric heater and the second electric heater.

The first output driver 182 of the HCU 162 is connected with an electrical connector 200 to and may provide a current to the first heater HI connection 186. The second output driver 184 of the HCU 162 is connected with an electrical connector 200 to and may provide a current to the second heater HI connection 188. When the HCU 162 provides a current to the heater 108 using the first output driver 182 and the second output driver 184, the voltage of the connection between the HCU 162 and the first heater HI connection 186 is equal to the voltage of the connection between the HCU 162 and the second heater HI connection 188.

III. OVERVIEW OF ELECTRICAL CONNECTORS

Figure 8:
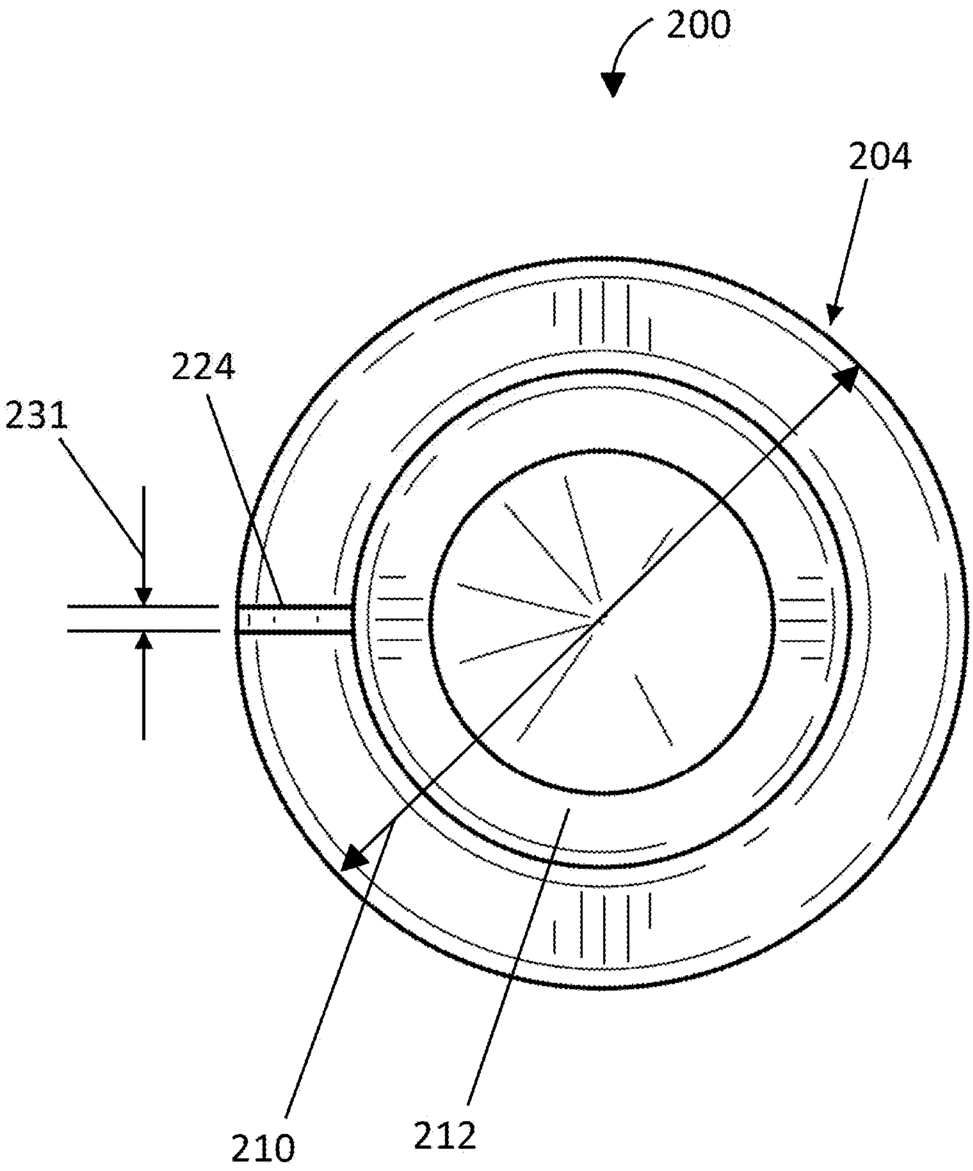
FIG. 8 is a right side view of the electrical connector of FIG. 4, according to an embodiment.
Figure 9:
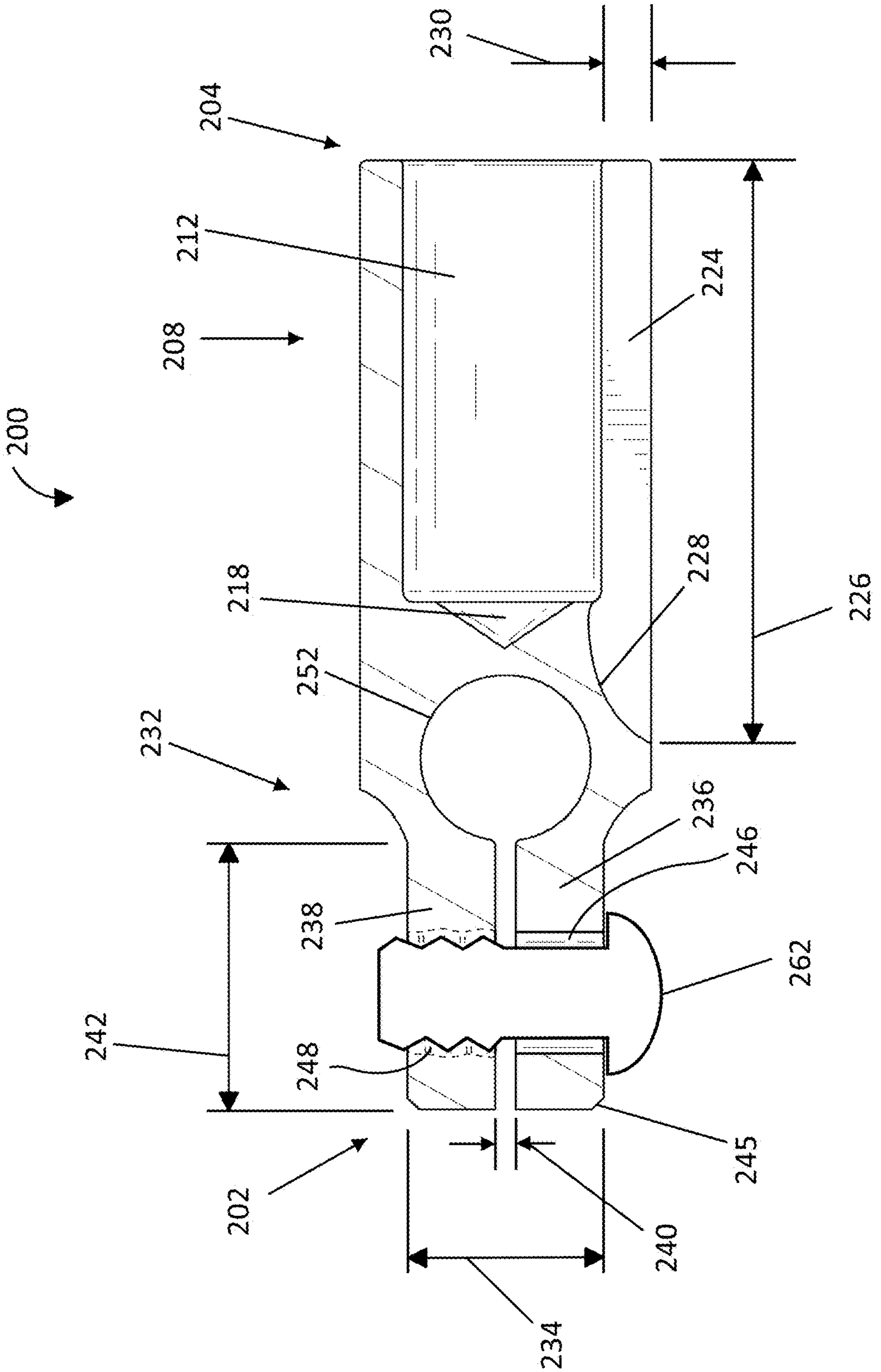
FIG. 9 is a cross-sectional view of the electrical connector of FIGS. 4 and 6 taken along the line 9-9 of FIG. 6, according to an embodiment.
Figure 10:
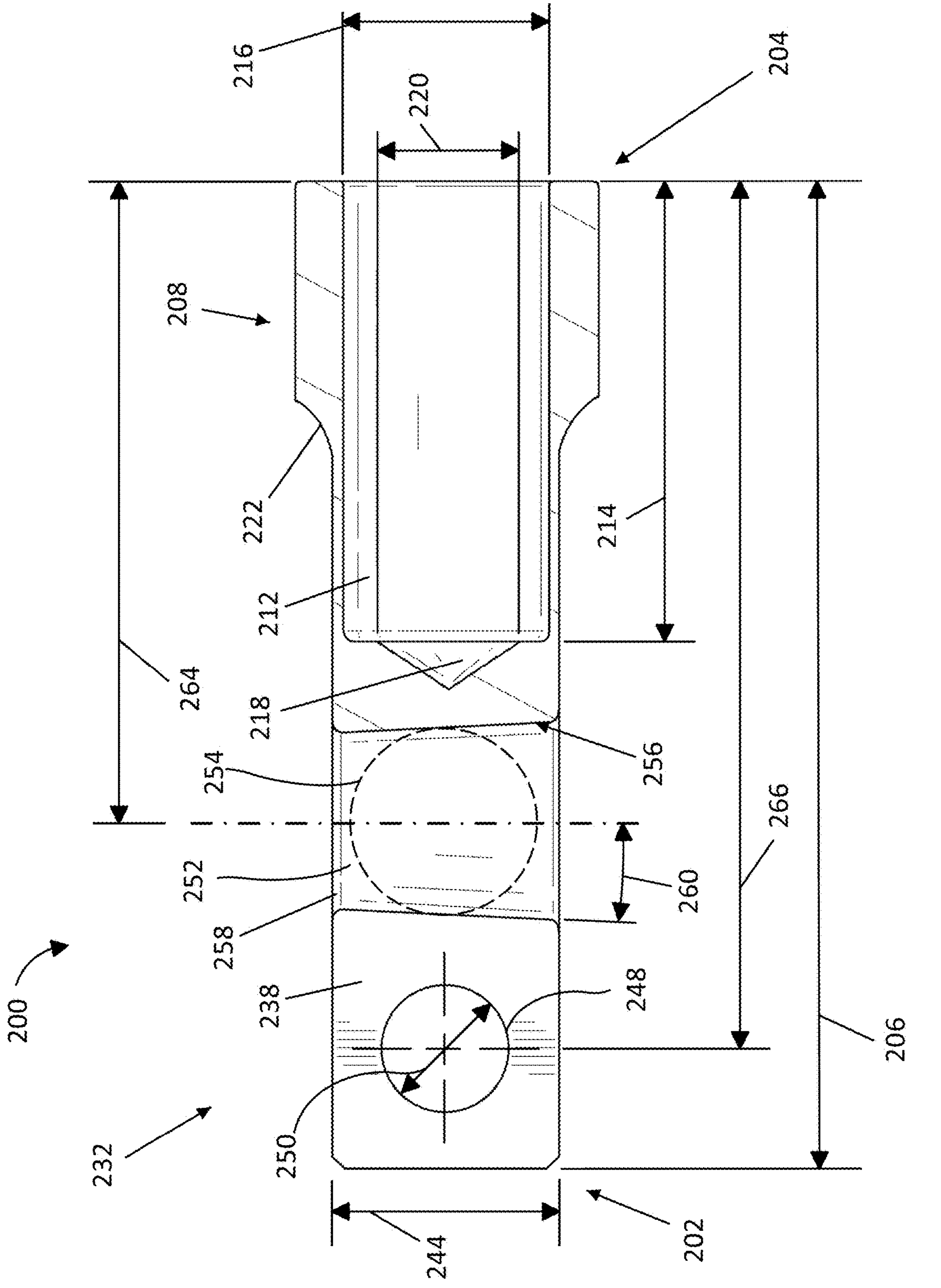
FIG. 10 is a cross-sectional view of the electrical connector of FIGS. 4 and 5 taken along the line 10-10 of FIG. 5 including a tapered third through hole, according to an embodiment.

FIGS. 4-11 illustrate an electrical connector 200 for conducting high electrical current in a hot environment according to an embodiment. The electrical connector 200 includes a first end 202 and a second end 204 opposing the first end 202. The electrical connector 200 includes a length 206 defined as a distance between the first end 202 and the second end 204, as illustrated in FIG. 10. In some embodiments, the length 206 of the electrical connector 200 is between approximately 30 mm and approximately 41 mm. In other embodiments, the length 206 of the electrical connector 200 is between approximately 32 mm and approximately 39 mm.

The electrical connector 200 includes a tubular wire connection portion 208 disposed along the second end 204. The tubular wire connection portion 208 includes an outer diameter 210, as illustrated in FIG. 8. In some embodiments, the outer diameter 210 of the tubular wire connection portion 208 is between approximately 5 mm and approximately 19 mm. In other embodiments, the outer diameter 210 of the tubular wire connection portion 208 is between approximately 8 mm and approximately 16 mm.

Figure 11:
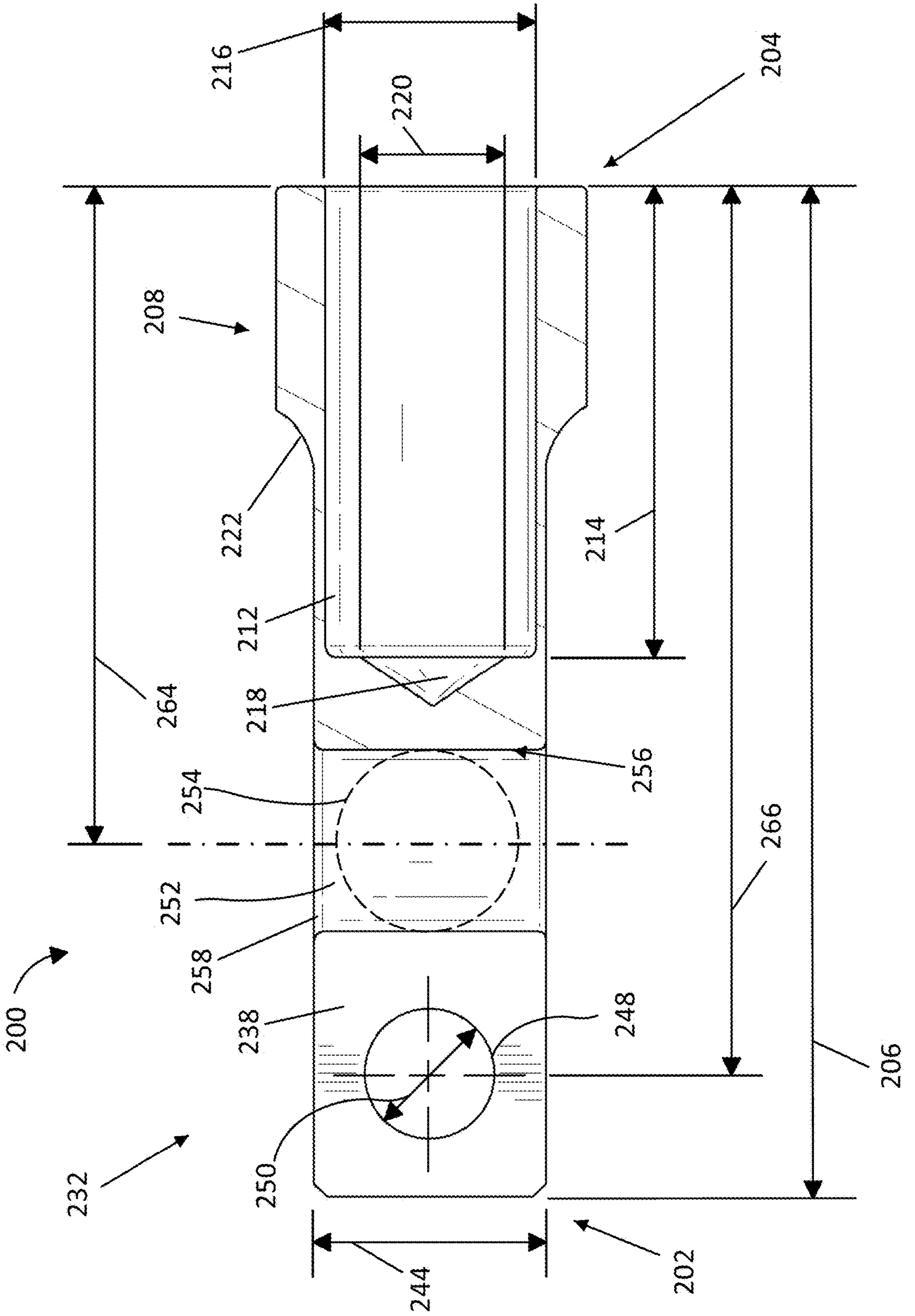
FIG. 11 is a cross-sectional view of the electrical connector of FIGS. 4 and 5 taken along the line 10-10 of FIG. 5 including a cylindrical third through hole, according to an embodiment.

The tubular wire connection portion 208 includes a recess 212 extending inwards partially through the tubular wire connection portion 208 along a first direction from the second end 204 to the first end 202. The recess 212 is configured to receive the wire 193. The tubular wire connection portion 208 may receive an electrical current from the wire 193 and may transmit an electrical current to the rest of the electrical connector 200. The recess 212 includes a length 214, as illustrated in FIGS. 10 and 11. In some embodiments, the length 214 of the recess 212 is between approximately 14 mm and approximately 18 mm. The recess 212 includes a diameter 216. In some embodiments, the diameter 216 of the recess 212 is between approximately 4 mm and approximately 14 mm. In other embodiments, the diameter 216 of the recess 212 is between approximately 5.5 mm and approximately 12.5 mm. The recess 212 includes a depression 218 resulting from a manufacturing process that includes drilling. The depression 218 includes a diameter 220. In some embodiments, the diameter 220 of the depression 218 is between approximately 4.50 mm and approximately 8 mm.

The tubular wire connection portion 208 also includes a fillet 222 on an outer surface of the tubular wire connection portion 208, as illustrated in FIGS. 10 and 11. In some embodiments, the fillet 222 has a length between approximately 2 mm and approximately 6 mm and a radius of curvature between approximately 1 mm and approximately 5 mm.

The tubular wire connection portion 208 also includes a slot 224. The slot 224 is configured to at least partially close when a compressive force is applied perpendicular to the slot 224, such that the tubular wire connection portion 208 is crimped onto the wire 193, when the wire 193 is received within the recess 212. In some embodiments, the slot 224 extends along at least half of a length of the tubular wire connection portion 208. In other embodiments, the slot 224 extends along an entire length of the tubular wire connection portion 208. The slot 224 includes a length 226, as illustrated in FIG. 9. In some embodiments, the length 226 of the slot 224 is between approximately 19 mm and approximately 23 mm. A portion of the slot 224 includes a radius of curvature 228. In some embodiments, the radius of curvature 228 of the portion of the slot 224 is between approximately 5 mm and approximately 8 mm. The slot 224 also includes a depth 230. In some embodiments, the depth 230 of the slot 224 is between approximately 1 mm and approximately 3 mm. The slot also includes a width 231, as illustrated in FIG. 8. In some embodiments, the width 231 of the slot 224 is between approximately 0.2 mm and approximately 0.5 mm.

Figure 7:
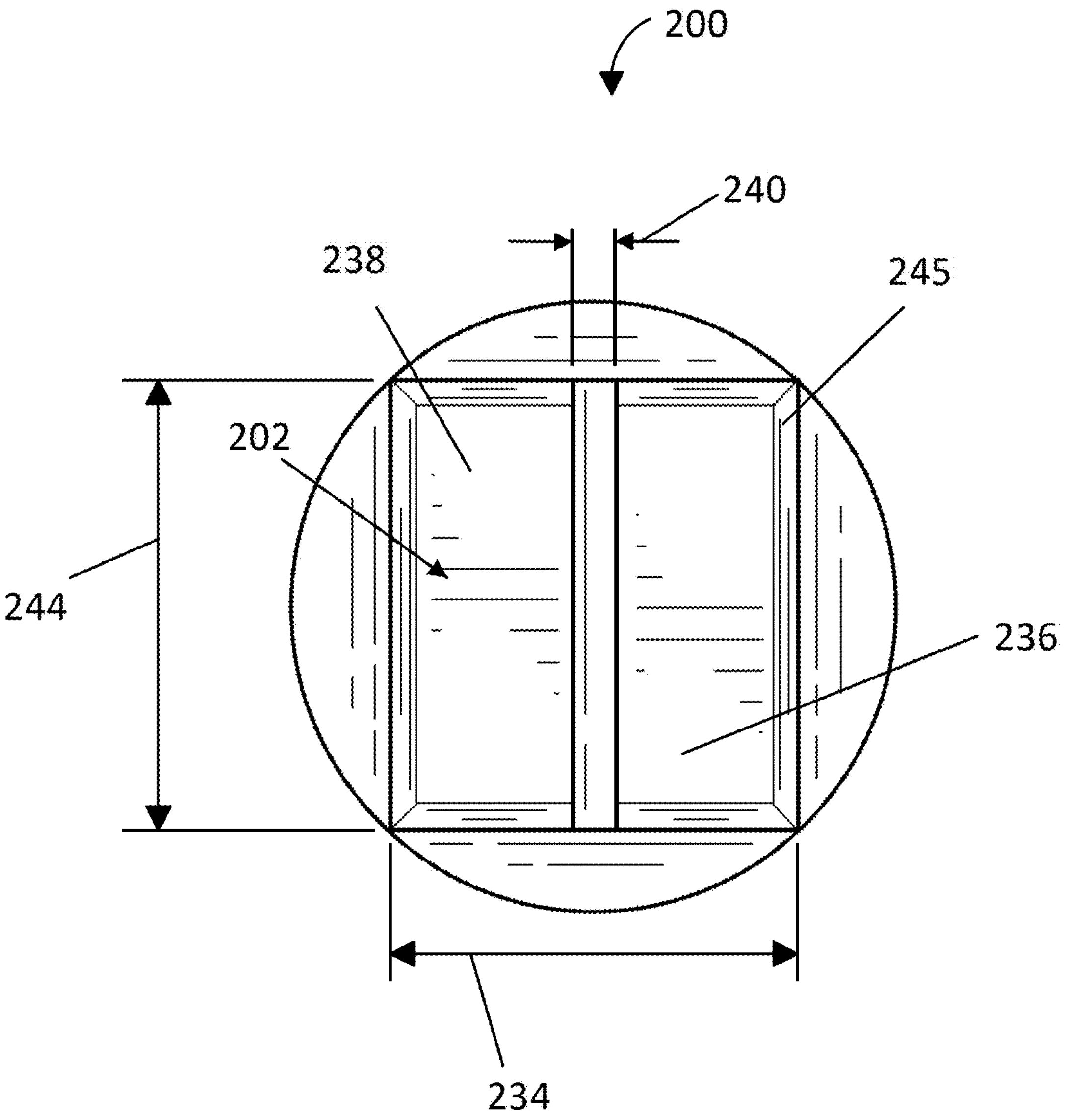
FIG. 7 is a left side view of the electrical connector of FIG. 4, according to an embodiment.

The electrical connector 200 also includes a pin connection portion 232 disposed along the first end 202. The pin connection portion 232 includes a width 234, as illustrated in FIGS. 7 and 9. In some embodiments, the width 234 of the pin connection portion 232 is between approximately 5 mm and approximately 9 mm. The pin connection portion 232 includes a first projection 236 and a second projection 238. The first projection 236 and the second projection 238 extend from the tubular wire connection portion 208 and include a width 240 in-between. In some embodiments, the width 240 between the first projection 236 and the second projection 238 is between approximately 0.5 mm and approximately 1 mm. The first projection 236 and the second projection 238 include a length 242 (e.g., the first projection 236 and the second projection 238 have approximately equal lengths). In some embodiments, the length 242 of the first projection 236 and the second projection 238 is between approximately 7 mm and approximately 11 mm. In other embodiments, the length 242 of the first projection 236 and the second projection 238 is between approximately 7 mm and approximately 11 mm. The first projection 236 and the second projection 238 include a height 244 (e.g., the first projection 236 and the second projection 238 have approximately equal heights), as illustrated in FIGS. 10 and 11. In some embodiments, the height 244 of the first projection 236 and the second projection 238 is between approximately 6 mm and approximately 10 mm.

In some embodiments, the first projection 236 and the second projection 238 include a cylindrical shape. In other embodiments, the first projection 236 and the second projection 238 include a cuboid shape. In this embodiment, at least one surface of the first projection 236 and the second projection 238 includes a chamfer 245, as illustrated in FIGS. 4-7. The chamfer 245 of the at least one surface of the first projection 236 and the second projection 238 includes a length between approximately 0.2 mm and approximately 0.8 mm and an angle between approximately 20 degrees and approximately 70 degrees.

The pin connection portion 232 also includes a first through hole 246 and a second through hole 248. The first through hole 246 extends through the first projection 236 and is centered along the height 244 of the first projection 236. The second through hole 248 extends through the second projection 238 and it aligned with the first through hole 246. The first through hole 246 and the second through hole 248 include a diameter 250 (e.g., the first through hole 246 and the second through hole 248 have approximately equal diameters), as illustrated in FIGS. 10 and 11. In some embodiments, the diameter 250 of the first through hole 246 and the second through hole 248 is between approximately 2.5 mm and approximately 6.5 mm.

The pin connection portion 232 also includes a third through hole 252 that is defined by the first projection 236 and the second projection 238. The third through hole 252 extends in a direction transverse to the first through hole 246 and the second through hole 248 and is configured to receive and contact the pin 109 in an electrically conductive manner (e.g., permitting an electrical current to be transmitted). The pin connection portion 232 may receive an electrical current from the tubular wire connection portion 208 and may transmit an electrical current to the pin 109. A portion of the pin connection portion 232 and the tubular wire connection portion 208 may be made of copper or other suitable materials. This enables a low-resistance connection among the electrical connector 200, the pin 109, and the wire 193. This also improves electrical conductivity and reduces heat generation at the electrical connector 200.

A portion of the third through hole 252 includes a diameter 254, as illustrated in FIGS. 10 and 11. In some embodiments, the diameter 254 of the portion of the third through hole 252 is between approximately 4 mm and approximately 11 mm. In other embodiments, the diameter 254 of the portion of the third through hole 252 is between approximately 5 mm and approximately 9.5 mm. The third through hole 252 also includes a three-dimensional tolerance zone 256. In some embodiments, the three-dimensional tolerance zone 256 is between approximately 0.1 mm and approximately 0.4 mm. In some embodiments, the third through hole 252 includes a chamfer 258. The chamfer 258 of the third through hole 252 is configured to have a length between approximately 0.1 mm and approximately 0.4 mm and an angle between approximately 20 degrees and approximately 70 degrees.

Figure 3:
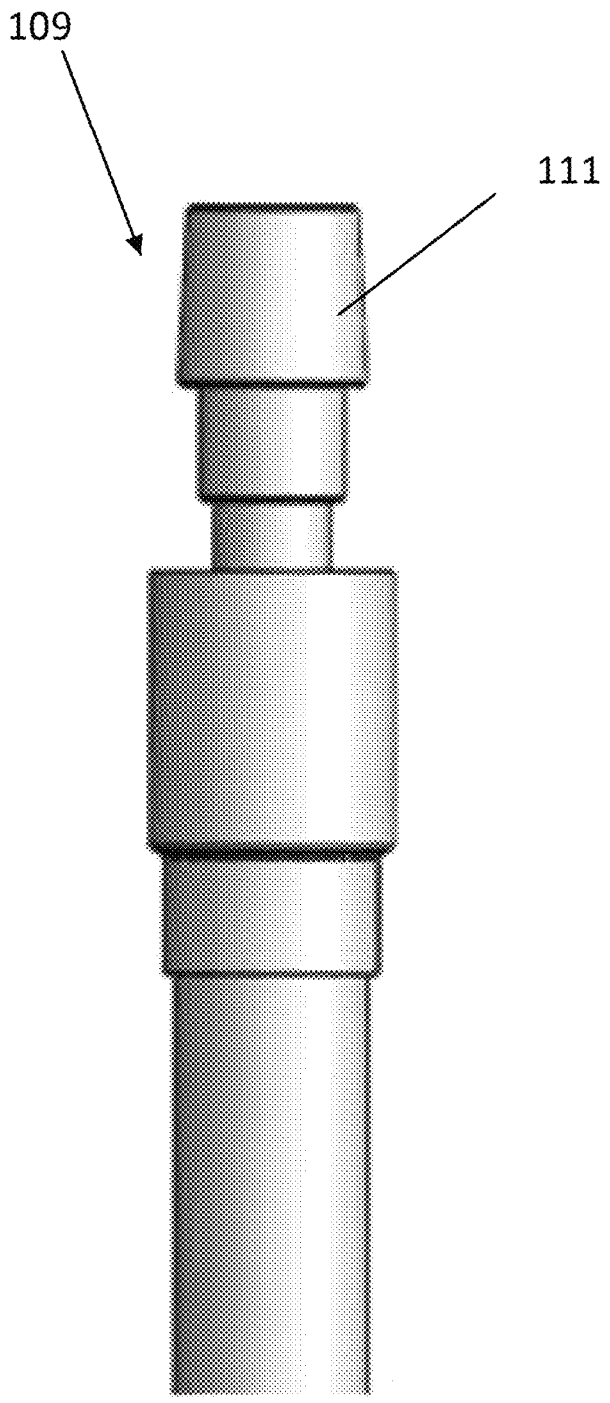
FIG. 3 is a front view of the pin of FIG. 2, according to an embodiment.
Figure 4:
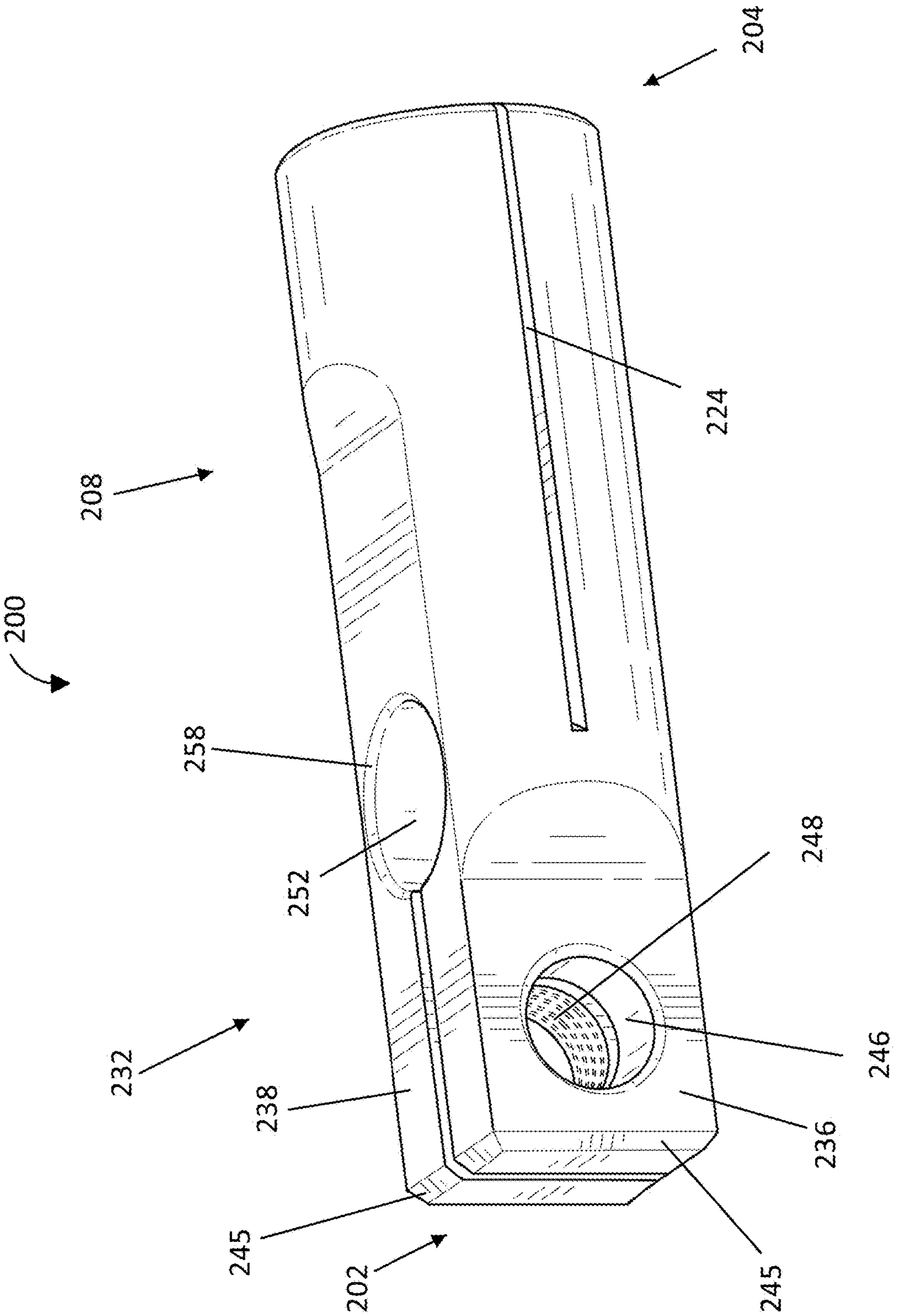
FIG. 4 is a perspective view of the electrical connector of FIGS. 1A and 1B, according to an embodiment.
Figure 5:
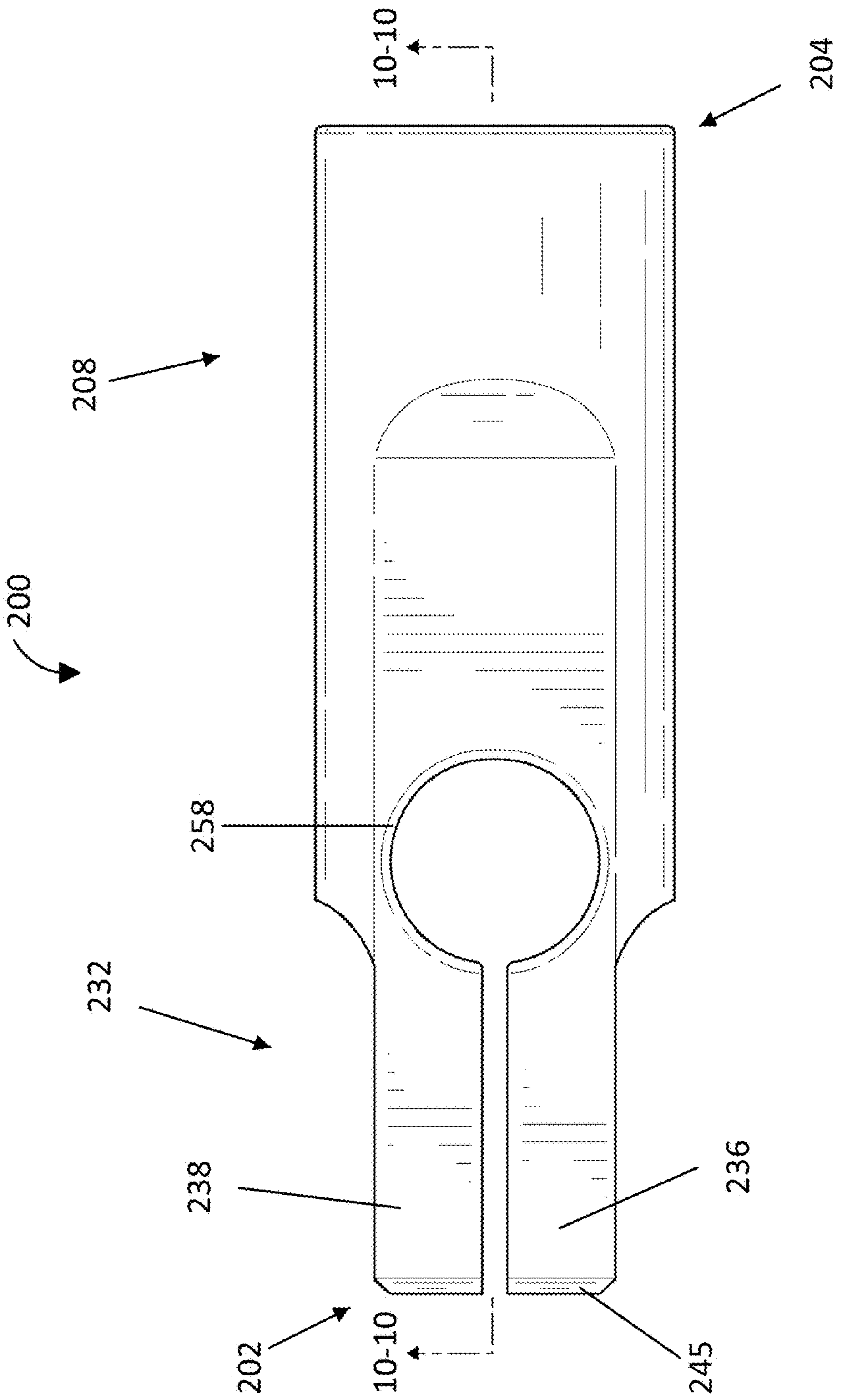
FIG. 5 is a top view of the electrical connector of FIG. 4, according to an embodiment.
Figure 6:
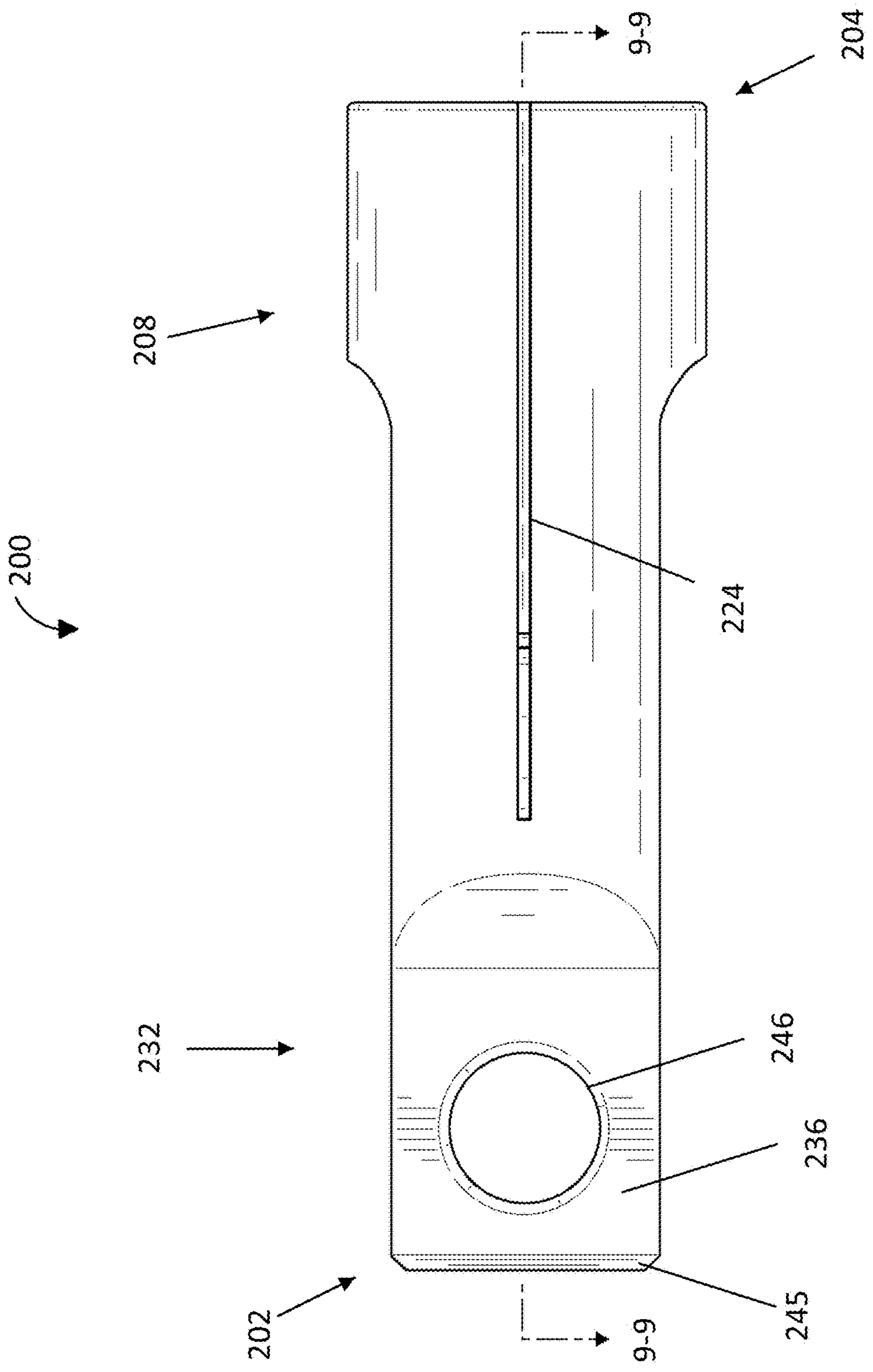
FIG. 6 is a front view of the electrical connector of FIG. 4, according to an embodiment.

In some embodiments, the third through hole 252 is cylindrical, as illustrated in FIG. 11. In other embodiments, the third through hole 252 is tapered, as illustrated in FIG. 10. In this embodiment, as illustrated in FIG. 3, the pin 109 includes a tapered cap 111. The tapered cap 111 is configured to include a taper angle that is equal, or approximately equal, to a taper angle 260 of the third through hole 252, such that the third through hole 252 is at least partially flush with the tapered cap 111, when the third through hole 252 receives the pin 109. In some embodiments, the taper angle 260 of the third through hole 252 is between approximately 1 degree and 5 degrees. In some embodiments, the tapered cap 111 is made of copper alloy.

The first through hole 246 and the second through hole 248 are configured to receive a fastener 262 and to be moved towards each other upon fastening (e.g., tightening, securing, etc.) the fastener 262. As the first through hole 246 and the second through hole 248 move towards each other via the fastener 262, a cross-sectional area of the third through hole 252 on a plane parallel to the length of the slot 224 is reduced. This allows the third through hole 252 to clamp the pin 109 when the first through hole 246 and the second through hole 248 are moved towards each other via the fastener 262. In some embodiments, the first through hole 246 is a unthreaded and the second through hole 248 is threaded, such that the fastener 262 is insertable through the first through hole 246 and threadable into the second through hole 248. This simplifies the installation and removal processes between the third through hole 252 and the pin 109.

The electrical connector 200 also includes a length 264 from a center of the third through hole 252 to the second end 204, as illustrated in FIGS. 10 and 11. In some embodiments, the length 264 from the center of the third through hole 252 to the second end 204 is between approximately 18 mm and approximately 27 mm. In other embodiments, the length 264 from the center of the third through hole 252 to the second end 204 is between approximately 20 mm and approximately 25 mm. The electrical connector also includes a length 266 from a center of the second through hole 248 to the second end 204. The length 266 from the center of the second through hole 248 to the second end 204 is equal, or approximately equal, to a length from a center of the first through hole 246 to the second end 204. In some embodiments, the length 266 from the center of the second through hole 248 to the second end 204 is between approximately 26 mm and approximately 37 mm. In other embodiments, the length 266 from the center of the second through hole 248 to the second end 204 is between approximately 29 mm and approximately 34 mm.

In some embodiments, the electrical connector 200 has a total mass between approximately 9.3 grams and approximately 11.5 grams and a total volume between approximately 1200 $mm^3$ and approximately 2300 $mm^3$. This allows the electrical connector 200 to have a small mass and a small volume, when compared to a junction box with ring eyelets bolted to buss bars. This is desirable as it lowers a total mass of a vehicle carrying (e.g., holding, containing, etc.) the electrical connector 200, thereby improving a fuel efficiency of the vehicle. Furthermore, the small volume of the electrical connector 200 provides additional space within the aftertreatment system 100 for other components of the aftertreatment system 100. Additionally, considering a material cost and manufacturing process, the electrical connector 200 costs less (e.g., cheaper, less expensive, etc.) than the junction box or a permanent connection, where the pin 109 is permanently connected to the wire 193.

IV. OVERVIEW OF EXAMPLE EMBODIMENTS

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An electrical connector comprising:

a tubular wire connection portion having:

a recess in which a wire is insertable, wherein the recess extends in a first direction, and a slot extending in the first direction along the recess, wherein the tubular wire connection portion is configured to be crimped onto the wire; and a pin connection portion comprising:

first and second projections extending in the first direction from the tubular wire connection portion, a first through hole that extends through the first projection, a second through hole that extends through the second projection and is aligned with the first through hole, and a third through hole that is defined by the first projection and the second projection and extends in a direction transverse to the first and second through holes, wherein the first and second through holes are configured to receive a fastener and to be moved towards each other upon fastening of the fastener, wherein the third through hole is configured to receive a pin and to clamp the pin when the first and second through holes are moved towards each other by the fastener, and wherein, in a cross-section perpendicular to the first direction and aligned with the third through hole, at least a portion of an outer surface of the pin connection portion is curved.

2. The electrical connector of claim 1, wherein the slot extends along at least half of a length of the tubular wire connection portion.

3. The electrical connector of claim 1, wherein the slot extends along an entire length of the tubular wire connection portion.

4. The electrical connector of claim 1, wherein the third through hole is tapered.

5. The electrical connector of claim 1, wherein the third through hole is cylindrical.

6. The electrical connector of claim 1, wherein the first through hole is unthreaded and the second through hole is threaded, such that the fastener is insertable through the first through hole and threadable into the second through hole.

7. An aftertreatment system comprising:
a heater comprising a pin;
a heater power source comprising a wire; and
an electrical connector comprising:
a tubular wire connection portion having a recess in which the wire is insertable, wherein the recess extends in a first direction, and wherein the tubular wire connection portion is configured to be crimped onto the wire, and
a pin connection portion comprising:
first and second projections extending from the tubular wire connection portion,
a first through hole that extends through the first projection,
a second through hole that extends through the second projection and is aligned with the first through hole, and
a third through hole that is defined by the first projection and the second projection and extends in a direction transverse to the first and second through holes,
wherein the first and second through holes are configured to receive a fastener and to be moved towards each other upon fastening of the fastener, and
wherein the third through hole is configured to receive the pin and to clamp the pin when the first and second through holes are moved towards each other by the fastener.

8. The aftertreatment system of claim 7, wherein the tubular wire connection portion comprises a slot.

9. The aftertreatment system of claim 8, wherein the slot extends along at least half of a length of the tubular wire connection portion.

10. The aftertreatment system of claim 8, wherein the slot extends along entire length of the tubular wire connection portion.

11. The aftertreatment system of claim 7, wherein the third through hole is tapered.

12. The aftertreatment system of claim 7, wherein the third through hole is cylindrical.

13. The aftertreatment system of claim 7, wherein the first through hole is unthreaded and the second through hole is threaded, such that the fastener is insertable through the first through hole and threadable into the second through hole.

14. The aftertreatment system of claim 7, wherein the pin comprises a tapered cap.

15. The aftertreatment system of claim 14, wherein the tapered cap comprises copper alloy.

16. The aftertreatment system of claim 7, wherein the wire comprises an insulated copper portion.

17. The electrical connector of claim 1, wherein a length of the slot is greater than a length of the recess.

18. The electrical connector of claim 1, wherein the slot is adjacent to the third through hole in a direction perpendicular to the first direction.

19. An electrical connector comprising:
a first end;
a second end opposite of the first end;
a tubular wire connection portion disposed along the second end, the tubular wire connection portion having:
a recess in which a wire is insertable, wherein the recess extends in a first direction, and
a slot extending in the first direction along the recess,
wherein the tubular wire connection portion is configured to be crimped onto the wire;
a pin connection portion disposed along the first end, the pin connection portion comprising:
first and second projections extending in the first direction from the tubular wire connection portion to the first end,
a first through hole that extends through the first projection,
a second through hole that extends through the second projection and is aligned with the first through hole, and
a third through hole that is defined by the first projection and the second projection and extends in a direction transverse to the first and second through holes,
wherein the first and second through holes are configured to receive a fastener and to be moved towards each other upon fastening of the fastener, and
wherein the third through hole is configured to receive a pin and to clamp the pin when the first and second through holes are moved towards each other by the fastener; and
a flat surface that extends continuously in the first direction from the tubular wire connection portion to the first end.

* * * * *